(12) United States Patent
Dick et al.

(10) Patent No.: US 7,335,422 B2
(45) Date of Patent: Feb. 26, 2008

(54) ABSORBENT POLYMERIC MATERIAL

(75) Inventors: Stefan O. Dick, Weichering (DE); Sebastien Brogly, Choisy le Roi (FR); Eric Judek, Compiegne (FR); Francois Dessus, Chamarande (FR)

(73) Assignee: Sud-Chemie Inc., Louisville, KY (US)

( * ) Notice: Subject to any disclaimer, the term of this patent is extended or adjusted under 35 U.S.C. 154(b) by 137 days.

(21) Appl. No.: 10/996,916

(22) Filed: Nov. 24, 2004

(65) Prior Publication Data

US 2005/0124758 A1 Jun. 9, 2005

Related U.S. Application Data

(63) Continuation-in-part of application No. 10/328,579, filed on Dec. 24, 2002, now Pat. No. 7,201,959.

(60) Provisional application No. 60/375,841, filed on Apr. 25, 2002.

(51) Int. Cl.
*B32B 3/00* (2006.01)
*B32B 1/16* (2006.01)
*B32B 18/00* (2006.01)
*B32B 27/00* (2006.01)

(52) U.S. Cl. .................. 428/500; 428/220; 428/323; 428/325; 428/328; 428/330; 428/331; 428/332

(58) Field of Classification Search .............. None
See application file for complete search history.

(56) References Cited

U.S. PATENT DOCUMENTS

| | | | |
|---|---|---|---|
| 2,781,326 A | 2/1957 | Lewis, Jr. | |
| 3,245,946 A | 4/1966 | O'Conner | |
| 3,833,406 A | 9/1974 | White | |
| 4,013,566 A | 3/1977 | Taylor | |
| 4,061,807 A | 12/1977 | Shaler | |
| 4,203,876 A | 5/1980 | Dereppe | |
| 4,485,204 A | 11/1984 | Nabors | |
| 4,665,050 A | 5/1987 | Degen | |
| 4,699,823 A * | 10/1987 | Kellenberger et al. | 428/219 |
| 4,894,417 A | 1/1990 | Holden | |
| 5,078,909 A | 1/1992 | Shigeta | |
| 5,288,532 A | 2/1994 | Juhl | |
| 5,389,709 A | 2/1995 | Itamura | |
| 5,432,214 A | 7/1995 | Lancesseur | |
| 5,911,937 A | 6/1999 | Hekal | |
| 6,059,860 A | 5/2000 | Larson | |
| 6,080,350 A | 6/2000 | Hekal | |
| 6,124,006 A | 9/2000 | Hekal | |
| 6,130,263 A | 10/2000 | Hekal | |
| 6,174,952 B1 | 1/2001 | Hekal | |
| 6,177,183 B1 | 1/2001 | Hekal | |
| 6,187,269 B1 | 2/2001 | Lancesseur | |
| 6,194,079 B1 | 2/2001 | Hekal | |
| 6,214,255 B1 | 4/2001 | Hekal | |
| 6,221,446 B1 | 4/2001 | Hekal | |
| 6,279,736 B1 | 8/2001 | Hekal | |
| 6,465,532 B1 | 10/2002 | Hekal | |
| 6,486,231 B1 | 11/2002 | Hekal | |
| 6,613,405 B1 | 9/2003 | Hekal | |
| 6,684,605 B2 | 2/2004 | Weder | |
| 6,696,002 B1 | 2/2004 | Hekal | |
| 2002/0073530 A1 | 6/2002 | Ferri | |

FOREIGN PATENT DOCUMENTS

| | | |
|---|---|---|
| DE | 2721511 | 11/1977 |
| DE | 4013799 | 10/1991 |
| EP | 0 400 460 | 12/1990 |
| EP | 0 401 666 | 12/1990 |
| EP | 0 432 438 | 6/1991 |
| WO | WO 96/33108 | 10/1996 |
| WO | WO 97/32663 | 9/1997 |

* cited by examiner

*Primary Examiner*—Sheeba Ahmed
(74) *Attorney, Agent, or Firm*—Scott R. Cox (57) ABSTRACT

A moisture-absorbing polymeric material is disclosed which consists of a combination of a thermoplastic material with an absorbing agent. The thermoplastic material is chosen such that when the absorbing agent is added to the thermoplastic material in the molten state and subsequently formed into a product, the absorbing agent tends to migrate towards the surface of the moisture-absorbing polymeric material to form a migration zone, wherein the absorbing agent is more highly concentrated in the surface of the polymer material than towards the interior.

21 Claims, 8 Drawing Sheets

Infra-red micro-analyse (FT-IR) of the surface of an extruded strip (thickness 0.85mm). Spectral range is 4000 cm$^{-1}$ to 680 cm$^{-1}$, Nb of scan is 400, resolution is 2 cm$^{-1}$, analyse window is 40 m x 100 m from a transversal microtomic cut of 30 m.

Fig. 1

Infra-red micro-analyse (FT-IR) of the center of an extruded strip (thickness 0.85mm). Spectral range is 4000 cm$^{-1}$ to 680 cm$^{-1}$, Nb of scan is 400, resolution is 2 cm$^{-1}$, analyse window is 40 m x 100 m from a transversal microtomic cut of 30 m.

Fig. 2

Infra-red micro-analyse (FT-IR) of an extruded strip (thickness 0.40 mm). Spectral range is 4000 cm$^{-1}$ to 680 cm$^{-1}$, Nb of scan is 75, resolution is 2 cm$^{-1}$, analyse window is 20 m x 100 m from a transversal microtomic cut of 30 m.

Fig. 3

An optical microscope image of a cross section of a 0.8 mm extruded strip of a compostion of this example. The enrichment of molecular sieve at the surface of the strip is clearly visible by it's darker color.

An absorbent cartridge prepared according to the present invention.

A picture of a cartridge cross section taken with an optic microscope. The molecular sieve concentration gradient obtained during cooling (Cf. extrusion injection comparison report) is disclosed. The darker coats on the external surfaces represent the drying agent. For a thickness of 2.15 mm, the absorbing agent is on the external coats (0.8 mm) that represents 37% of the total thickness.

ABSORBENT POLYMERIC MATERIAL

RELATED APPLICATIONS

This application is a continuation-in-part of application Ser. No. 10/328,579, which was filed on Dec. 24, 2002, now U.S. Pat. No. 7,201,959 which claimed priority from U.S. provisional application Ser. No. 60/375,841, filed on Apr. 25, 2002.

BACKGROUND OF THE INVENTION

This invention relates generally to thermoplastic products with an absorbing agent entrained therein. More particularly the invention relates to a product of manufacture formed from a thermoplastic material that has an absorbing agent concentrated towards the surface of the product, wherein preferably a concentration gradient of the absorbing agent exists. The invention also relates to a process of manufacture of an absorbent polymeric material, formed as a product, comprising mixing a thermoplastic material with an absorbing agent, and forming the moisture absorbent polymeric product such that the absorbing agent is primarily concentrated toward the surface of the product, wherein preferably a concentration gradient of the absorbing agent to absorb moisture exists.

Many moisture-sensitive products must be shipped and stored in conditions that are as free from moisture as possible. For example, medications and diagnostic test strips often lose some of their efficacy after prolonged exposure to moisture and are preferably shipped and stored in moisture free environments. Containers for holding such products may be fashioned out of moisture-impermeable material, such as well-known thermoplastics, that resist entry of exterior moisture. However, entry of moisture into such containers is inevitable, either through diffusion or the opening and closing of the container, thereby exposing the product to humidity. In the case of medications, the end-user often opens the plastic container repeatedly in order to obtain just one dosage, exposing the remaining dosages to undesirable moisture-bearing air. Therefore, such containers preferably include means to absorb any moisture that enters the container before it affects the moisture-sensitive product inside.

Other items, such as food or other organic products, may actually release moisture after being placed within a container or sealed packaging, and if the packaging is substantially moisture-impermeable, then the moisture will remain in close contact with the product. In many cases this released moisture may actually be damaging to the product that released the moisture. In this instance, some desiccating means is preferably included in the packaging to absorb this released moisture and maintain a relatively dry environment.

Still other items, such as electronic components, may require a substantially moisture-free environment during shipment and storage to provide optimal performance. Such items are typically shipped in virtually moisture-impermeable containers, but the presence of initially trapped moisture, or the seepage of moisture over time, could still affect performance of such products. Once again, a desiccating means is preferably included in the shipping container that will absorb moisture, while not having an effect on the other components.

In order to absorb such excess moisture and protect the contained products, desiccating materials have been introduced into the interior of containers. These desiccants are usually in the form of powders or granules and therefore must be contained in some manner to prevent contamination of the product. Previous attempts to introduce desiccants to such containers have included the use of bags and packets formed from breathable materials, perforated plastic canisters, desiccant tablets and aerated plastic cartridges with the desiccant inside. These containers are problematic, however, as any breakage would release the desiccant freely into the container. Also, these desiccant containers can release some amount of dust originating from the desiccant fill and adversely effect the product to be protected from moisture. Other solutions involve the creation of a separate compartment within the container to hold the desiccant (for example in a desiccant filled stopper for a tube, or a side compartment within the tube), but such a compartment typically limits the moisture-to-desiccant contact and reduces the absorption rate. There is also the ever present danger of damage to the side compartment which will also release desiccant into the main container.

Thus, there is a need for a means of introducing an absorbing agent into a plastic container or other article of manufacture while preventing the absorbing agent from being released and potentially contacting the moisture-sensitive product. One means for accomplishing this goal is entraining the absorbing agent directly into a plastic structure, such that the desiccant cannot be released. A problem inherent in such structures, however, is that once the absorbing agent is entrained within the plastic, it has extremely limited contact with the outside moisture.

It is accordingly a primary object of the invention to provide an absorbing agent-entrained polymeric product that provides an effective amount of moisture-to-absorbing agent contact, preferably and surprisingly, without the use of wicking fibers.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention.

SUMMARY OF THE INVENTION

In accordance with the invention, a thermoplastic material is prepared with an absorbing agent entrained therein. During the manufacturing process of a product produced from such composition, the thermoplastic material assumes a molten or essentially non-solid state and the absorbing agent within the thermoplastic material is allowed to migrate toward the surface of the product so that the absorbing agent is concentrated in a gradient toward the surface of the manufactured product.

The accompanying drawings, which are incorporated in and constitute a part of this specification, illustrate embodiments of the invention and together with the description, serve to explain the principles of the invention.

DETAILED DESCRIPTION OF A PREFERRED EMBODIMENT

The present invention provides a high moisture absorbing polymeric material comprising a thermoplastic material blended with at least one absorbing agent. The moisture absorbing polymeric material (moisture absorbing polymeric product) exhibits a certain amount of separation of the constituent components, such that the concentration of the absorbing agent is much higher at the surface of products made from such absorbent polymeric material than at the interior, and that there exists a gradient of concentration of the absorbing agent towards the surface. "Separation" as used herein defines a concentration gradient difference and does not necessarily mean 100% separation of the components into distinct phases. Similarly, "layered" as used herein means a significant change in concentration gradient such that the product appears to be layered, and does not necessarily mean a solid layer of one component and a second layer of a different component. "Gradient" means that the concentration of any component of the absorbing polymeric material varies with distance from the surface of a product manufactured from the absorbing polymeric material.

"Thermoplastic material" as used herein is defined as a polymeric material that exhibits thermoplastic properties. While the thermoplastic material can be comprised of a polymer of a single monomer; a copolymer of two or more monomers, a mixture of two or more polymers from single monomers, mixtures of two or more copolymers, or mixtures of one or more polymers from a single monomer and one or more copolymers, in a preferred embodiment, the thermoplastic material comprises a mixture of two or more copolymers or a mixture of at least one polymer from a single monomer and at least one copolymer wherein the components of the mixture have a common monomeric unit. As a non-limiting example the thermoplastic material may be prepared from a blend of linear low density polyethylene (LLDPE), low density polyethylene (LDPE) and an ethylene vinyl acetate (EVA) copolymer, wherein each of the components include an ethylene unit.

Non-limiting examples of polymers from single monomers include: polystyrenes; polyolefins (polyethylene, polypropylene); polyacrylates, polymethacrylates: polyamides, polyimides, polyesters, polybutylene terephthalate, polycarbonates, polyethersulfones, and polyvinyl chloride. Non-limiting examples of copolymers include: styrene-butadiene rubbers (SBR); styrene-ethylene-butadiene-styrene copolymers (SEBS); butyl rubbers; ethylene-propylene rubbers (EPR); ethylene-propylene-diene monomer rubbers (EPDM); ethylene-vinyl acetate copolymers (EVA); ethylene-acrylate or butadiene-acrylonitrile; maleic anhydride modified polymers and copolymers; polyether-polyamide copolymers; and grafted copolymers. Absorbing agent, as used herein unless otherwise stated, is defined as any material capable of absorbing or adsorbing moisture, or otherwise removing moisture from a surrounding atmosphere. (Although technically different in the mechanism of reaction, for the purposes of this invention, the terms absorbing and adsorbing are intended to be used interchangeably.) Non-limiting examples of absorbing agents include: any desiccants, such as silica gel, zeolites, desiccant clay, molecular sieves, activated carbon, earth alkali oxides and the like.

The high moisture absorbing polymeric material is a solid and the shape can vary to form any product suitable to assist in moisture absorption. For example, the product may take the shape of a small cylindrical or cubical structure to be placed within a container that is intended to have low moisture content. A further example includes lining of containers or packaging products with the absorbent polymeric material of the present invention.

By way of example, a useful container for medicine or diagnostic strips and titration plates may be prepared by forming an exterior shell out of a substantially water impermeable thermoplastic material, such as polyethylene or polypropylene. One preferred method of manufacturing is that a full or partial liner may then be formed out of the absorbent polymeric material and added to the interior of the container. In another preferred embodiment the liner may either be formed inside the container in a dual injection mold, or formed separately from the container and later inserted. Another preferred method for forming the absorbent polymer is extrusion, and therefore the preferred method of forming such a liner would be separate extrusion of the liner and molding of the container, with later assembly of the two parts. According to yet another preferred embodiment the absorbent polymeric material may also be used to form the entire product (e.g. container or strip etc.), i.e. the entire product consists of the moisture absorbing polymeric material as defined herein. Thus, according to this embodiment no external shell is present. The product of the invention provides both a high absorption rate and good absorption kinetics due to the presence of the absorbing agent in the migration zone (near the surface) and a (moisture) barrier function due to the interior region depleted of the absorbing agent.

The moisture absorbing polymeric material may be used in any application in which absorption of moisture is desirable. Non-limiting examples include packaging of goods that are sensitive to moisture, such as food, diagnostic products, pharmaceuticals, semiconductor technology, or any general application that makes use of confined spaces in which a low humidity level is required over a period of time. This includes, without limitation, primary and secondary packaging. One further embodiment is directed to a stick used in wafer manufacturing. A further use of the moisture absorbing polymeric material is in odor-absorbing applications.

Where applicable, compositions of the invention further include appropriate quantities; preferably up to 10 percent, and most preferably up to 5% by weight of any organic or inorganic additives that are usual in the field of plastics, such as fillers, reinforcing agents, plasticizers, stabilizers, dyes, slipping agents, wetting agents, dispersants, anticlumping agents, anti-static agents, processing agents, blowing agents, and pigments.

Notwithstanding, the absorbent polymeric material preferably does not include wicking fibers, as these fibers may burn or melt during the manufacturing process. The inclusion of fibers to act as a wick for moisture is unnecessary because of the increased moisture absorbency of the layered structure of the composition of the invention.

Surprisingly, it has been found that products formed from the absorbent polymeric compositions exhibiting accumulation of absorbing agent in a "migration zone" in a gradient towards the surface show distinct advantages in moisture absorbency compared to structures that contain the same concentration of absorbing agent throughout the product (monolithic structures) and structures that contain desiccant only at the surface. While structures with desiccant only at the surface tend to have a limited overall moisture absorption capacity due to the relatively small amount of absorbing agent the surface can accommodate or be incorporated into, products according to this invention show a high capacity because not only the surface but also the entire structure of the product may be filled with effective amounts of absorbing agent. Monolithic structures with the same concentration of absorbing agent throughout the product tend to have a relatively low moisture absorption rate because the contact of moisture in the surroundings to the (relatively few) absorbing agent particles at or close to the surface is limited. In contrast, products according to this invention contain relatively high amounts of absorbing agent at and close to the surface and are thus able to react faster with the moisture in the surrounding compared to monolithic structures. Further, the preferred gradient of the absorbing agent in the migration zone surprisingly also provides an advantageous transport chain for transporting the substance to be absorbed by the absorbing agent, e.g. moisture, away from the surface rapidly. Thus, no excess moisture remains transiently on the surface due to delayed transport into the interior of the product. In contrast, monolithic structures, structures with an absorbing agent only on the surface, and also multilayered structures wherein adjacent or joined layers containing different concentrations of absorbing agents are combined are more prone to delayed moisture transport away from the surface and consequently to excess moisture on the surface, with potentially harmful consequences for the moisture-sensitive article to be protected. According to a preferred embodiment of the invention, the gradient of the absorbing agent is a continuous gradient and preferably is comprised of a continuous decrease of the concentration of absorbing agent from the surface towards the interior of the layer, as exemplified e.g. in FIG. 3. From this it becomes clear that the present invention combines high absorbent capacity and relatively high initial absorbing rates and thus overcomes the shortfalls of both structures with absorbing agent at the surface only, and monolithic structures. In addition, products according to this invention can be designed to exhibit higher or lower initial absorption rates although having the exact same chemical composition and same thickness, by increasing or decreasing the extent of the accumulation of the absorbing agent within the "migration zone" and/or the thickness of the "migration zone" itself.

The moisture absorbing polymeric material preferably contains:

about 20% to about 85% by weight of one or more thermoplastic materials; and about 15% to about 80% by weight of at least one absorbing agent.

The composition is prepared such that the absorbing agent tends to concentrate in a gradient within the migration zone near the surface of the polymeric composition. In a preferred embodiment, the concentration of the absorbing agent at the surface creates distinct layers of the composition, which are identifiable, i.e., a surface layer that is enriched in the absorbing agent and an interior layer that is depleted of that same absorbing agent.

The surface layers (usually on both opposite surfaces of products like strips and tubes) of the product made from the absorbent polymeric material generally form relatively well defined "migration zones", to which the absorbing agent "migrates." Within this migration zone the maximum concentration of the absorbing agent at a given volume unit is from 2 to 10 times, preferably 2 to 6 times, higher than its concentration in the interior or core layer of the product. The concentration of the absorbing agent within the migration zone preferably exhibits a gradient towards the surface. The concentration of the absorbing agent at any location within the product and the extent of the migration of the absorbing agent may be determined by infra-red microanalysis. For that purpose the integrated peak intensities of characteristic IR absorption bands of absorbing agent (and copolymer, if used) are measured as functions of depth $\delta$, using transversal microtomic cuts of a suitable thickness (e.g. 30 μm). The individual values are standardized by comparison to the integrated absorption intensity of the polymer component at the respective depth $\delta$ and plotted as functions $D(\delta)$ and $C(\delta)$ of depth from the surface for values 0 to d (d being the total thickness of the part). The amount of desiccant contained at any depth interval ($\Delta\delta=\delta_2-\delta_1$) can be calculated from the quotient of $\int D(\delta) \, d\delta$ (limits $\delta_1$, $\delta_2$) and $\int D(\delta) \, d\delta$ (limits 0, d). The "migration zones" are defined by the depth from the surface at which the accumulation of desiccant has leveled off ($\delta_l$), and starts to increase ($\delta_r$), respectively. The amount of desiccant contained in these zones can be calculated as explained above by calculating the quotient of $\int D(\delta) \, d\delta$ (limits 0, $\delta_l$) and $\int D(\delta) \, d\delta$ (limits 0, d) for the first migration zone and of $\int D(\delta) \, d\delta$ (limits $\delta_r$, d) and $\int D(\delta) \, d\delta$ (limits 0, d) for the second migration zone. So far all (simple) parts prepared according to this invention exhibited two migration zones, however, it cannot be excluded that parts prepared according to this invention may contain only one or more than two migration zones. When comparing the amount of absorbing agent that is present in the interior layer of the composition with the amount present in the migration zone (at a given volume unit), there is a reduction of at least about 50%, preferably at least about 65% and most preferably at least about 85% of the amount of the absorbing material that is present in the migration zone.

The thickness of this migration zone varies depending upon a number of factors, including the composition of the thermoplastic material, the ratio of the copolymer to the polymeric material that makes up the thermoplastic material, assuming such a blend is utilized, the concentration of the absorbing agent utilized, the amount of non-common monomer that is present in the blend of copolymer with polymer mixture, if such a mixture is utilized, and the parameters set when forming products from the absorbent polymeric material. In addition, it has been surprisingly discovered that the higher the percentage of copolymer present, the thicker the migration zone. Notwithstanding, it has been surprisingly discovered that the thickness of the migration zone is generally from about 1 to about 100 microns, preferably from about 10 to about 80 microns, and most preferably from about 20 to about 60 microns from the surface of the moisture adsorbing polymeric material depending on the process of manufacture of the product. While the overall thickness of the migration zone may vary, especially in products which are very thick, it has been surprisingly found that the thickness of the migration zone seems to be relatively independent of the total thickness of the material and is generally from about 1 to about 100 microns.

It has also been surprisingly discovered that the accumulation of the absorbing agent at a given volume unit within the migration zone is substantially greater than the accumulation at a given volume unit throughout the interior layer of the product. It is surprisingly found that the percentage of the adsorbing agent present in the migration zones of a product formed from the absorbent polymeric material is at least about 2%, preferably at least about 4%, and most preferably at least about 6% of the overall amount of adsorbing agent present in the product, with maximum amount present being no more than about 70%, preferably no more than 50% and most preferably no more than about 40% of the overall amount of absorbing agent.

In order to achieve this phase separation, it has been found preferable to use as the thermoplastic component a blend of at least one polymer derived from a single monomer with at least one copolymer. Surprisingly, it has been discovered that the higher the percentage of copolymer in use, the greater the amount of absorbing agent that is present in the migration zone. In addition, the higher the percentage of copolymer percent, the thicker the migration zone. Preferably, the copolymer contains the monomer of the single monomer component of the polymer so that the two polymeric materials are compatible. If two or more copolymers are mixed to form the thermoplastic material, each should preferably contain at least one common monomer. In such preferred blended thermoplastic compositions, it has been observed that one of the components of the thermoplastic blend tends to enrich at the surface together with the absorbing agent, while the other component tends to enrich towards the center of the product.

In general, the absorbent polymeric materials are manufactured by compounding methods.

In one preferred method of manufacture of the absorbent polymeric material, the polymer and copolymer (if any) are mixed by dry blending without the use of solvents or without melting the polymeric materials. The blended polymer and copolymer (if any) are then fed into a first zone of a compounding machine simultaneously (but independently) with the absorbing agent. This first zone of mixing is preferably kept at a temperature below the melting points of all components, preferably about 50° C. The mixture is then fed into the subsequent zones of the compounding machine where the polymer and copolymer material are melted and blended with the absorbing agent. In a preferred embodiment the blended materials are then extruded through a die into a cold water batch and shred into granules.

Generally, in a second step the absorbent polymeric materials are formed into products. This forming of products may be performed by any known method for producing thermoplastic products, such as extrusion, injection molding, blow molding, etc., provided that such method involves transforming the absorbent polymeric material into essentially a non-solid state, preferably by melting the thermoplastic material to a liquid state. While not wishing to be bound by any particular theory, it can be contemplated that only in an essentially non-solid state and during the forming process (injection molding, extrusion, etc.) is the absorbing agent able to migrate to the surface of a formed product.

Thus, care must be taken to prepare such articles so that the absorbing agent and thermoplastic may exhibit the sufficiently desired separation through the migration described herein while in the essentially non-solid state. Again, while not wishing to be bound by any particular theory, in certain embodiments in which the thermoplastic material comprises more than one polymer or copolymer, it is believed that the absorbing agent has more attraction toward one of the polymeric materials and will migrate towards the surface along with the polymeric material while the separation takes place.

The thickness of the migration zone and the amount of absorbing agent being accumulated therein is also influenced by the parameters set during formation of the products. As indicated above, the migration of the absorbing agent is only possible as long as the absorbent polymeric material assumes an essentially non-solid state. Thus, parameters such as forming method (injection molding, blow molding, extrusion), temperature of the absorbent polymeric material when formed, temperature regulation of tools or molds during forming, flow characteristics of the material, flow rate during forming, shape of the product formed, cycle times etc. are important in determining the amount of time of the migration of the absorbing agent during forming (migration time). The migration time is defined as the time while forming of a product during which the absorbent polymeric material is still in an essentially non-solid state so that migration of the absorbing agent can occur.

In practice, it has been found that extrusion methods of manufacture with levels of shear less than about $100_s^{-1}$ provide for more separation phenomenon than does injection molding. Again, while not wishing to be bound by any particular theory, this is probably because the extrusion process provides for more directed and constant flow of material in a single direction, which allows a reasonably long migration time. With injection molding, which involves strong turbulence, with shear rates between $1,000_s^{-1}$ and $10,000_s^{-1}$, the material flows in one direction, but then comes into contact with the walls of the injection mold causing a backflow and partial re-mixing of the liquid composition. The extent of re-mixing is also influenced by the shape of the product formed. Also, in injection molding, the walls of the injection mold tend to rapidly cool the outer layers of the injected thermoplastic, thereby preventing strong migration of the absorbing agent to those outer layers.

The skilled artisan can adjust the parameters mentioned above by performing routine experiments in order to optimize these parameters for each individual product concerning migration time and thus achieve the desired thickness of migration zone and accumulation of absorbing agent therein.

The present invention is demonstrated by the following nonlimiting examples:

EXAMPLE 1

To demonstrate the phenomenon of absorbing agent migration towards the surface, a composition was prepared consisting of 50% by weight of a thermoplastic material and 50% by weight of a desiccant (molecular sieve). The thermoplastic material consisted of 22% by weight of a linear low density polyethylene (LLDPE), 62% by weight of a low density polyethylene (LDPE), and 16% by weight ethylene vinyl acetate (EVA) copolymer.

The mixture was formed into thin strips having variable thickness by extrusion and injection molding. The strips were then sliced into cuts of 30 μm, so that the concentration of the separate components could be analyzed at the surface, and every 30 μm until the center is reached.

Figure 1:
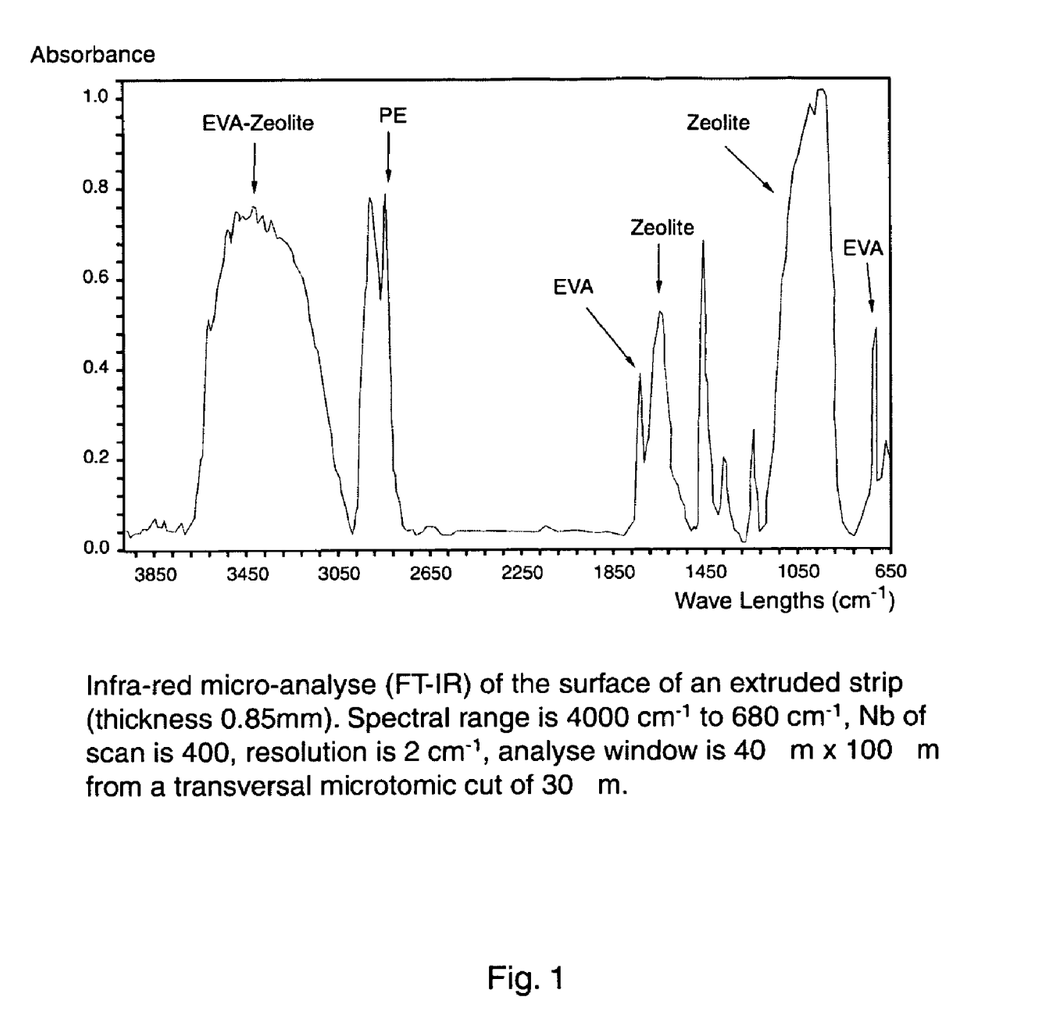
FIG. 1 is an infra-red micro-analysis (FT-IR) of the surface of an extruded strip of absorbing polymeric material prepared according to Example 1 with a thickness 0.85 mm. (For purpose of the Figures and Examples, zeolite is considered a molecular sieve.)
Figure 2:
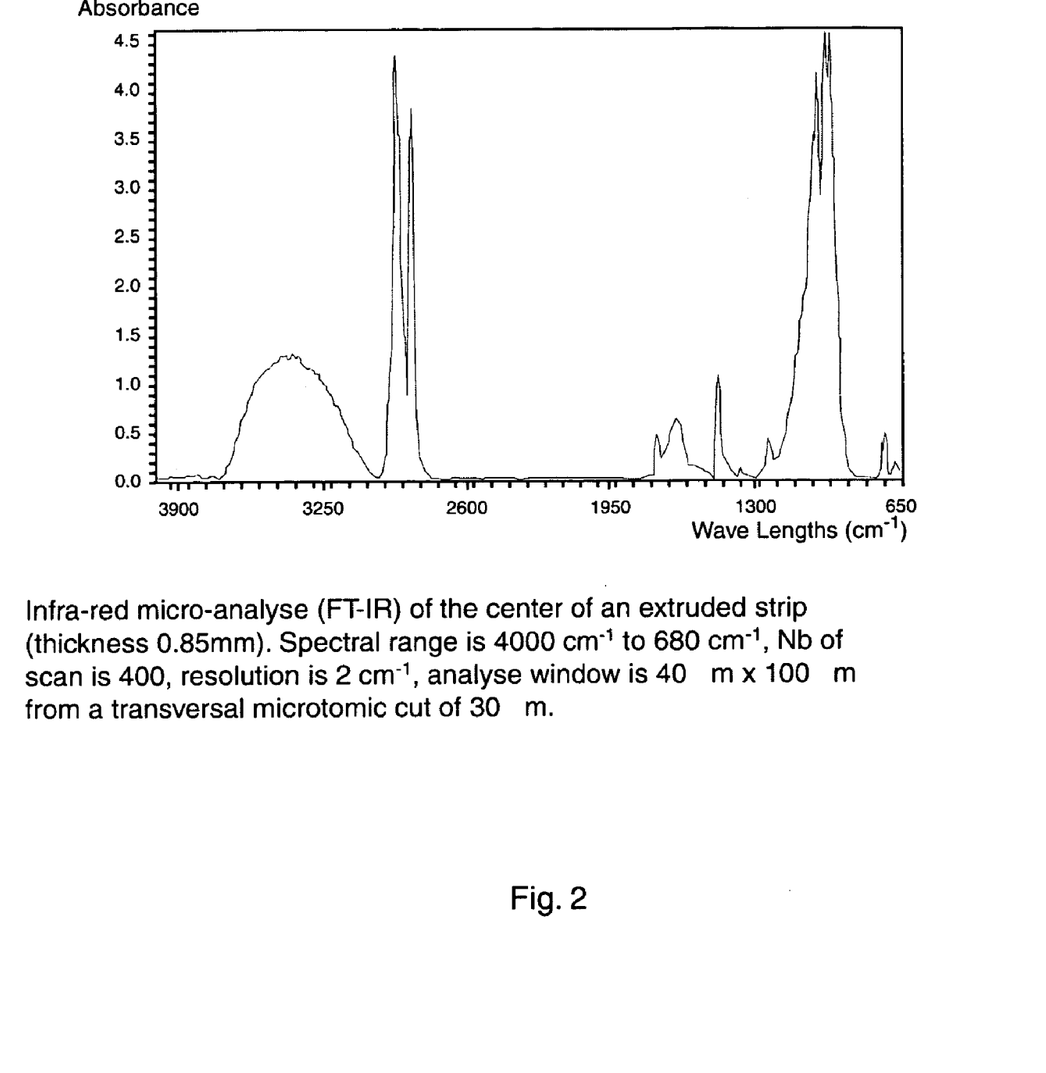
FIG. 2 is an FT-IR of the center of an extruded strip of the absorbing product, prepared according to Example 1 with a thickness of 0.85 mm.

Turning now to FIGS. 1 and 2, FIG. 1 shows an infra-red spectral analysis of the surface of an extruded test strip prepared according to the present invention having an overall thickness of 850 µm. The extrusion process was carried out at about 200° C. and about 110 bar pressure. In FIG. 1, the peaks for polyethylene, EVA, and the molecular sieve were identified. FIG. 2 shows the same data taken from the center of an extruded strip, also prepared according to the present invention. As can be seen from the two IR analyses, the amplitude of the EVA and molecular sieve peaks, and therefore the concentration of EVA and molecular sieve, is much higher at the surface of the strip than it is in the center. Conversely, the polyethylene peak, and therefore the concentration of polyethylene, is higher in the center of the extruded strip.

Figure 3:
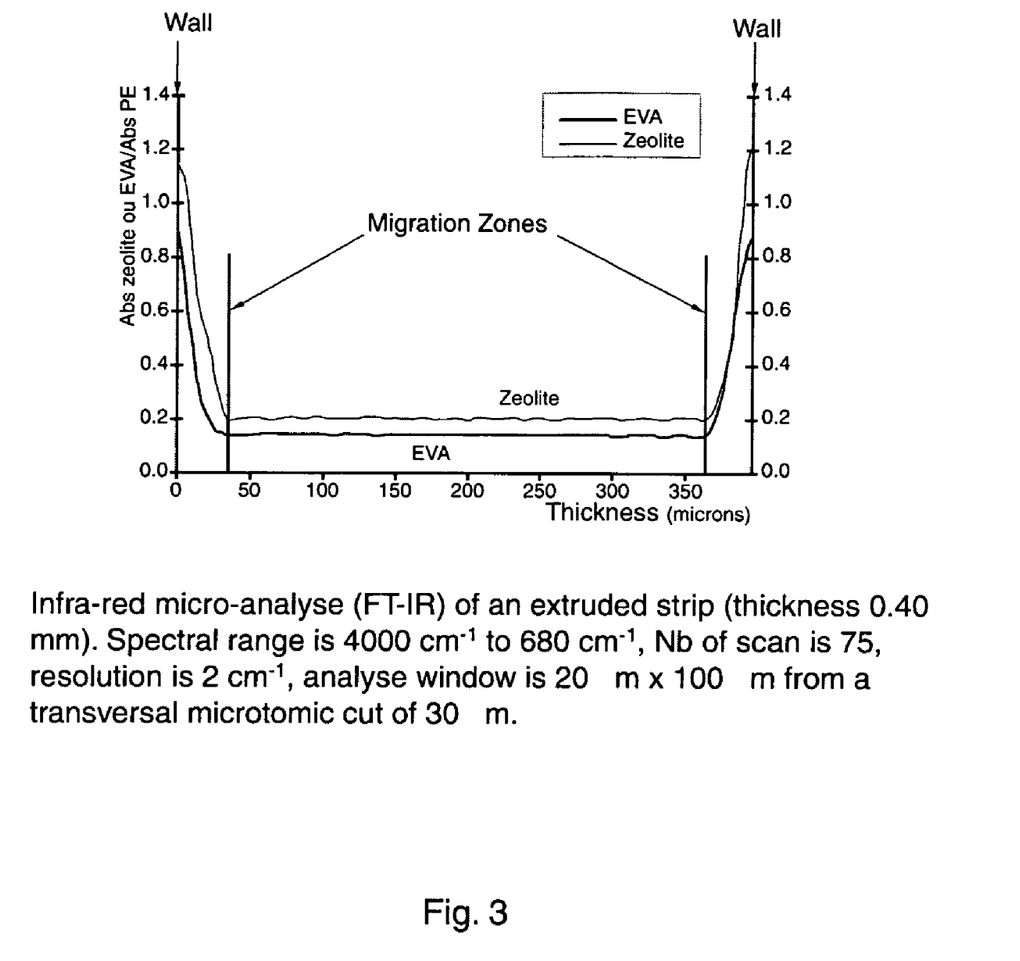
FIG. 3 is an FT-IR of the entire extruded strip of the adsorbent product of Example 1.

FIG. 3 shows the results of an IR spectral analysis of an entire extruded strip, which was 0.40 mm in thickness. As can be seen from FIG. 3, the concentration of EVA and molecular sieve was very high at the two surfaces of the strip, and then leveled off at about 35 µm deep in the strip. The concentration of EVA and molecular sieve then stayed almost constant from 35 µm deep to the center of the strip.

The section of the composition where the EVA and molecular sieve concentration climbs to its peak is called the migration zone thickness. For the above example, the migration zone thickness of the extruded strip was 35 µm. Surprisingly, we observed that the overall thickness of the strip does not appear to essentially affect the migration zone thickness. For example, an extruded strip having the same composition as set forth in Example 1 would be expected to have a migration zone thickness of about 35 µm regardless of the thickness of the strip.

Figure 8:
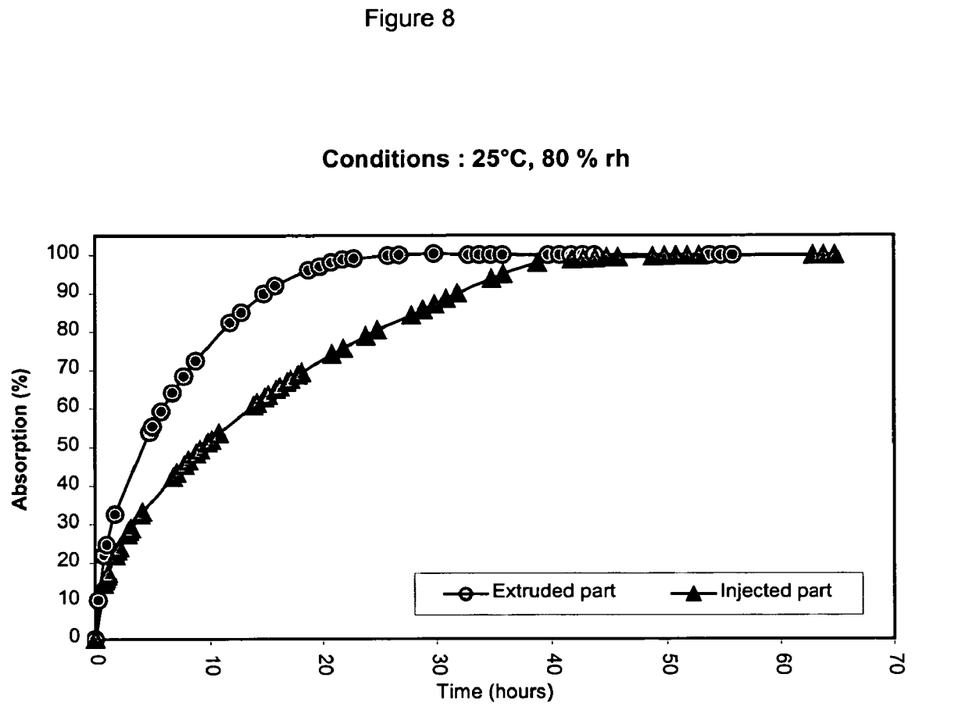
FIG. 8 shows a comparison of the moisture absorption of an injected molded sample with a thickness of 1170 μm in comparison with an extruded sample with a thickness of 1140 μm, tested at 25° C. over time. Both samples are produced by the process of Example 1.

This phenomenon is set forth in the following Table 1 comparing strips of varying thickness prepared by both extrusion and injection:

shown in FIG. 8. As can be seen, the extruded part reacts faster with moisture than the injection molded part. The time to reach saturation is 26 days for the extruded part, and 64 days for the injection molded part. This is consistent with migration zones of 55 µm for the extruded and 24 µm for the injection molded part.

Figure 4:
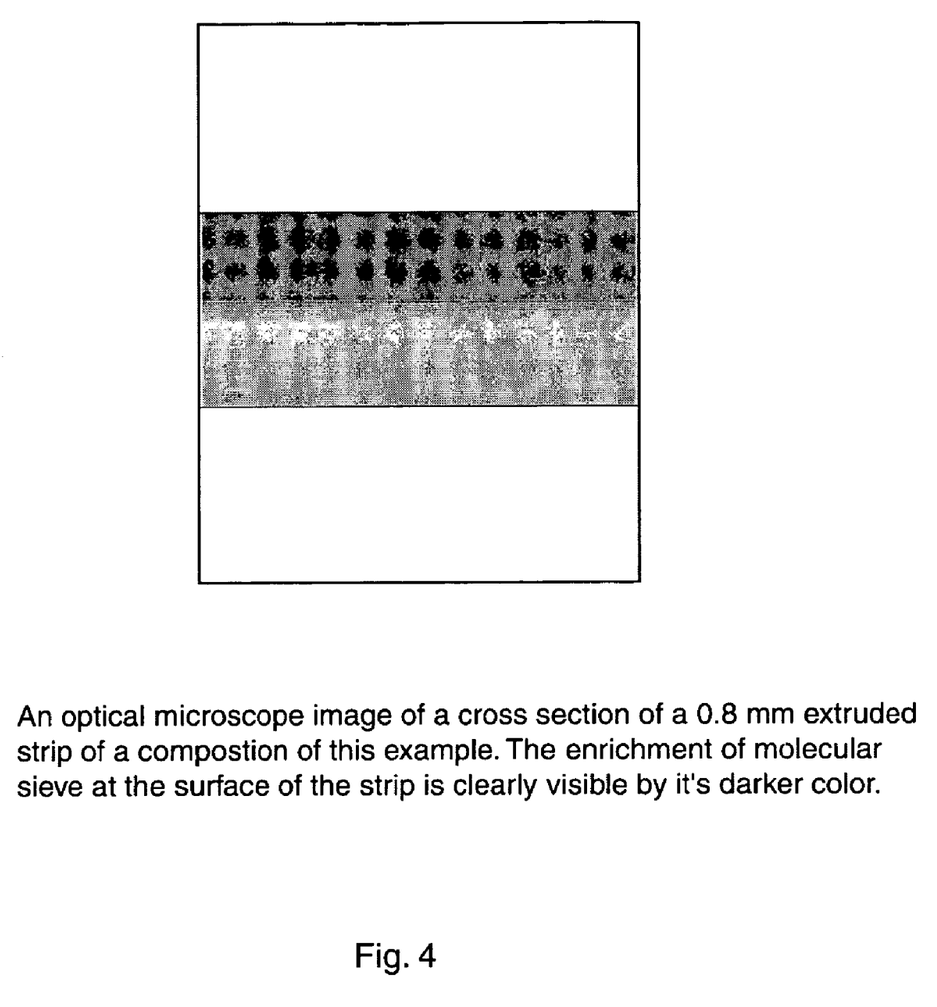
FIG. 4 is an optical microscope cross section of an extruded strip of a product prepared according to Example 1, utilizing a molecular sieve as the absorbing agent, showing the molecular sieve concentration gradient.

FIG. 4 shows an optical microscope image of a cross section of a 1.2 mm extruded strip of a composition of this example. The enrichment of molecular sieve (absorbing agent) at the surface of the strip is clearly visible by its darker color.

The moisture uptake of such a strip was measured to be 10.5% by weight at 25° C., 80% r.h.

EXAMPLE 2

Figure 5:
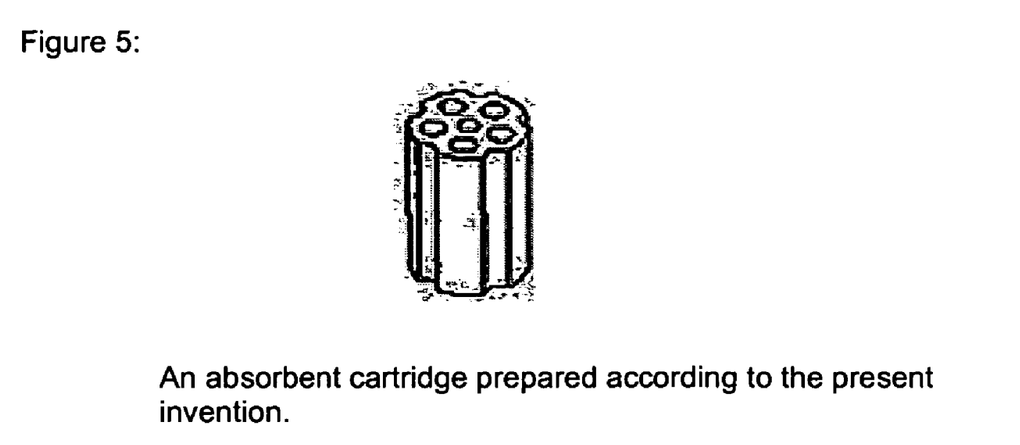
FIG. 5 is a drawing of an absorbing cartridge prepared according to Example 2.
Figure 6:
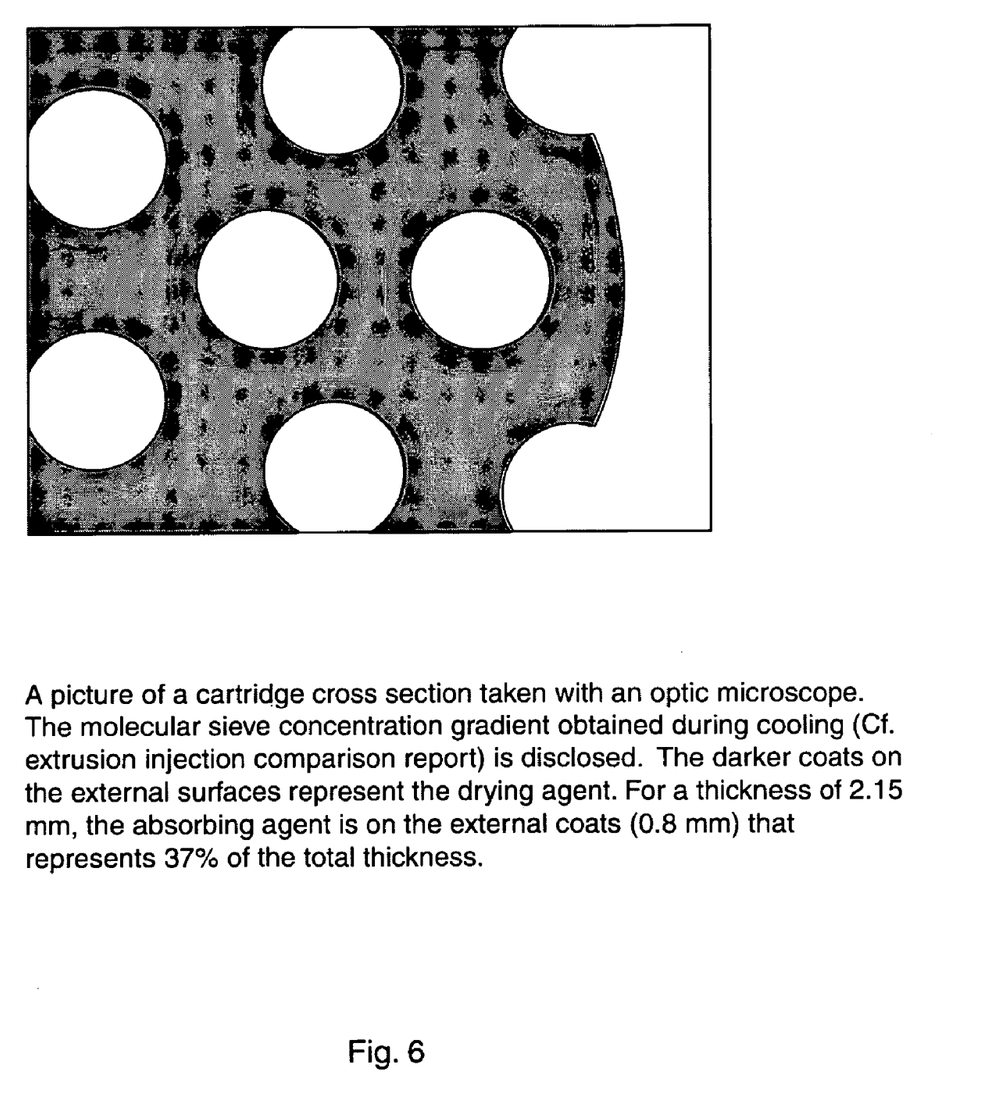
FIG. 6 is a photograph of a cross section of the cartridge of FIG. 5, showing the absorbing agent concentration gradient, taken with an optical microscope.

The concentration of desiccant towards the surface of a different polymeric composition is displayed visually in this example. An absorbent polymer composition comprising 65% by weight of a thermoplastic material and 35% by weight of an absorbing agent (silica gel) was prepared. The thermoplastic material comprised a blend of 92.3% by weight polystyrene and 7.7% by weight styrene-ethylene-butadiene-styrene copolymer. An absorbent cartridge was prepared by injection molding similar to that shown in FIG. 5. Such a cartridge may be useful for placing inside a container for moisture sensitive products such as medicine. FIG. 6 is a picture of a cross section of the cartridge taken with an optic microscope. The concentration of molecular sieve towards the surfaces of the cartridge can be clearly seen by the dark grey areas in the photograph.

TABLE 1

Influence of processing mode and thickness on EVA and Molecular sieve exudation.

| | | EVA (1737 cm$^{-1}$) | | | | Molecular sieve (1652 cm$^{-1}$) | | | |
|---|---|---|---|---|---|---|---|---|---|
| Processing mode | Thickness (µm) | Intensity at the surface 1 (u.a.) | Migration zone (µm) | Intensity at the surface 2 (u.a.) | Migration zone (µm) | Intensity at the surface 1 (u.a.) | Migration zone (µm) | Intensity at the surface 2 (u.a.) | Migration zone (µm) |
| Injection | 1995 | 0.926 | 26.3 | 0.938 | 26.4 | 1.040 | 23.2 | 1.338 | 27.0 |
| | 1390 | 0.794 | 23.7 | 0.785 | 26.2 | 1.124 | 29.2 | 1.115 | 26.5 |
| | 1170 | 0.627 | 23.2 | 0.650 | 27.9 | 0.906 | 23.6 | 0.891 | 24.0 |
| Injection | 900 | 0.493 | 25.2 | 0.488 | 27.4 | 0.687 | 24.6 | 0.692 | 26.5 |
| Extrusion | 1140 | 0.863 | 55.1 | 0.870 | 55.1 | 1.155 | 55.1 | 1.163 | 55.1 |
| | 855 | 0.984 | 57.7 | 0.989 | 53.8 | 1.329 | 51.5 | 1.320 | 55.8 |
| | 395 | 0.876 | 39.1 | 0.866 | 34.4 | 1.140 | 36.9 | 1.198 | 34.1 |

(Surface 1 and 2 are the two sides of the strip.)

The table shows that the thickness of the migration zone for injection molded parts seems to be independent of the thickness of the part. However, the concentration of molecular sieve accumulated at the surface seems to be a function of the thickness, i.e. the thicker the injection molded part the higher is the amount of molecular sieve. Not wishing to be bound by any particular theory, this finding can be explained by the fact that a thicker injection molded part has a longer cooling time until the molten components solidify (migration time) and thus give the molecular sieve more time to accumulate at the surface and form a layered structure.

The moisture absorption of injection molded samples with 1170 µm thickness and extruded samples with 1140 µm thickness were tested at 25° C., 80 r.h. (relative humidity) as

EXAMPLE 3

This example demonstrates that absorbent polymer compositions with very high absorption capacities can be prepared according to this invention. An absorbent polymer composition comprising 30% by weight of thermoplastic material and 70% by weight of an absorbing agent (molecular sieve) was prepared. The thermoplastic material comprised 76.7% by weight ethylene-methylacrylate copolymer and 23.3% by weight ethylene-acrylic ester-maleic anhydryde copolymer.

Figure 7:
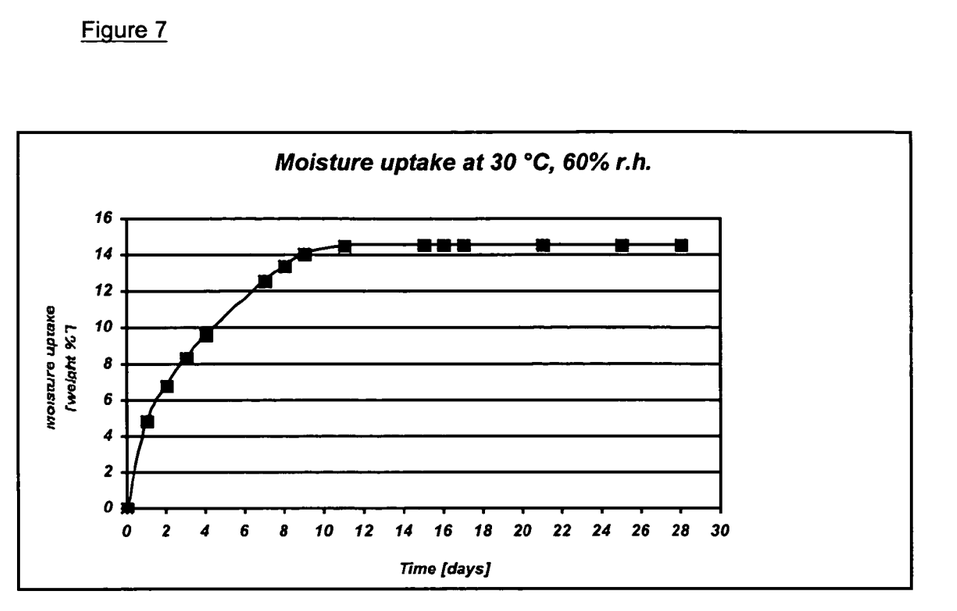
FIG. 7 is a curve showing the moisture uptake capacity of the material described in Example 3.

Strips with a thickness of 1.3 mm were extruded from this composition. As shown in FIG. 7, moisture uptake was measured to be 14.6% by weight at 30° C., 60% r.h.

EXAMPLE 4

An absorbent polymer composition comprising 50% by weight of a thermoplastic material and 50% by weight of an absorbing agent (molecular sieve) was prepared. The thermoplastic material comprised a blend of 92.3% by weight polystyrene and 7.7% by weight styrene-ethylene-butadiene-styrene copolymer.

This composition was formed into injection molded articles (0.9 mm, 1.1 mm and 1.5 mm thick plates, 1.08 mm thick tubes) and extruded articles (strips of thickness 0.5 mm and 0.6 mm, 1.2 mm thick tube).

The determination of absorbing agent accumulation and migration zone for the composition of Example 4 is shown in Table 2. The amount of molecular sieve was determined by using the integrated intensity of the IR absorption peak at 1652 cm$^{-1}$ compared to the integrated intensity of a polystyrene/SEBS IR absorption band between 2821-3112 cm$^{-1}$.

According to Table 2 typical migration zones extend between approximately 20 to 40 μm from the surfaces into the articles. The IR peak intensity ratio molecular sieve: (polystyrene/SEBS) drops to approximately between 50 to 20% of the surface value within the migration zone. This means that the molecular sieve concentration per volume unit at the immediate surface of the parts is between 2 and 5 times higher than in the core of the material.

TABLE 2

| Sample | Sample Thickness | Molecular sieve intensity surface 1 | Migration zone surface 1 | Molecular sieve intensity surface 2 | Migration zone Surface 2 |
| --- | --- | --- | --- | --- | --- |
| Injected plate | 895 μm | 1.515 | 24 μm | 1.509 | 23 μm |
| Injected plate | 1075 μm | 1.603 | 23 μm | 1.604 | 24 μm |
| Injected plate | 1495 μm | 1.690 | 25 μm | 1.713 | 25 μm |
| Injected tube | 1080 μm | 1.606 | 25 μm | 1.610 | 23 μm |
| Extruded strip | 445 μm | 1.495 | 37 μm | 1.522 | 38 μm |
| Extruded strip | 575 μm | 1.745 | 38 μm | 1.522 | 38 μm |
| Extruded tube | 1170 μm | 2.126 | 40 μm | 2.126 | 40 μm |

The following Table 3 shows the amounts of desiccant accumulated in the migration zones as percentages of the total desiccant amounts.

TABLE 3

| Sample | Sample Thickness | Molecular sieve accumulated surface 1 | Molecular sieve accumulated surface 2 |
| --- | --- | --- | --- |
| Injected plate | 895 μm | 6.0% | 5.7% |
| Injected plate | 1075 μm | 5.4% | 5.7% |
| Injected plate | 1495 μm | 4.6% | 4.7% |
| Injected tube | 1080 μm | 5.9% | 5.5% |
| Extruded strip | 445 μm | 16.1% | 16.6% |
| Extruded strip | 575 μm | 15.6% | 15.6% |
| Extruded tube | 1170 μm | 10.2% | 10.3% |

These results show that considerable amounts of the absorbing agent are accumulated at and close to the immediate surface of the parts manufactured according this invention.

EXAMPLE 5

The same compound as described in Example 1 was prepared. The compound was then mixed with various amounts of ammonium hydrogencarbonate (0%, 0.5%, 0.8) as a blowing agent and extruded into tubes of approximately 1 mm thickness.

A blowing agent is defined as a material that is mixed with the compound before the step of forming articles by extrusion, injection molding or other means, and that escapes the compound as a gas or vapour at least partially during this process.

| Sample | Blowing Agent | Sample Thickness | Molecular sieve intensity surface 1 | Migration zone surface 1 | Molecular sieve intensity surface 2 | Migration zone Surface 2 |
| --- | --- | --- | --- | --- | --- | --- |
| Extruded tube | 0% | 1080 μm | 0.876 | 53 μm | 0.874 | 52 μm |
| Extruded tube | 0.5% | 1050 μm | 1.098 | 55 μm | 1.097 | 54 μm |
| Extruded tube | 0.8% | 1105 μm | 1.611 | 53 μm | 1.613 | 56 μm |

| Sample | Blowing agent | Sample Thickness | Molecular sieve accumulated surface 1 | Molecular sieve accumulated surface 2 |
| --- | --- | --- | --- | --- |
| Extruded tube | 0% | 1080 μm | 11.3% | 11.1% |
| Extruded tube | 0.5% | 1050 μm | 13.8% | 13.5% |
| Extruded tube | 0.8% | 1105 μm | 16.1% | 17.0% |

These results show that addition of a blowing agent to the compounds upon forming articles does not seem to influence the extent of the migration layer. However, the amount of molecular sieve that is accumulated in this layers seems to increase with increasing amount of blowing agent.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A moisture absorbing polymeric product comprising a blend of a thermoplastic material and an absorbing agent, wherein the thermoplastic material is transformed into a molten or essentially non-solid state during formation of the product, wherein the product comprises at least one migration zone and an interior region, wherein the migration zone is defined as the portion of the product from its surface to where the accumulation of the absorbing agent levels off, wherein the maximum concentration of the absorbing agent within a given volume unit of the migration zone at the surface of the product is at least twice that of the absorbing agent within that same volume unit of the interior region, wherein the absorbing agent is concentrated within the migration zone in a gradient that increases from the interior region to the surface of the product, and wherein a wicking fiber is not added to the blend.

2. The product according to claim 1 wherein the thermoplastic material is selected from the group consisting of a polymer of a single monomer, a copolymer of two or more monomers, a mixture of two or more polymers from single monomers, a mixture of two or more copolymers and a mixture of at least one polymer from a single monomer and at least one copolymer.

3. The product of claim 1 wherein the thermoplastic material is a mixture of at least one polymer of a single monomer and at least one copolymer.

4. The product of claim 3 wherein at least one copolymer of the thermoplastic material contains a common monomeric unit with the polymer.

5. The product of claim 1 wherein the thermoplastic material is a mixture of two copolymers containing a common monomeric unit.

6. The product of claim 1 wherein the migration zone comprises from about 1 to about 100 microns of thickness of the product.

7. The product of claim 1 wherein the concentration of the absorbing agent within the migration zone is from about 2 to about 6 times that of the absorbing agent within the interior region of the product.

8. The product of claim 1 wherein the thickness of the migration zone is from about 10 to about 80 microns.

9. The product of claim 1 wherein the thermoplastic material is selected from the group consisting of polystyrenes, polyolefins, polyacrylates, polymethacrylates, polyimides, polycarbonates, polyethersulfones, polyamides, polyesters, polyvinyl chloride, styrene-butadiene rubbers, styrene-ethylene-butadiene-styrene copolymers, butyl rubbers, ethylene-propylene rubbers, ethylene-propylene-diene rubbers, ethylene vinyl acetate copolymers, ethylene-acrylates, butadiene-acrylonitrile, maleic anhydride modified polymers and copolymers, and grafted copolymers.

10. The product of claim 1 wherein the absorbing agent is selected from the group consisting of silica gel, zeolites, desiccant clay, molecular sieves, activated carbon, earth alkali oxides and mixtures thereof.

11. A moisture absorbing polymeric product comprising a thermoplastic material and an absorbing agent, wherein the thermoplastic material is transformed into a molten or essentially non-solid state during formation of the product, wherein the product comprises at least one migration zone and an interior region of the product, wherein the migration zone is defined as the portion of the product from its surface to where the accumulation of the absorbing agent levels off, wherein the maximum concentration of the absorbing agent within a given volume unit of the migration zone at the surface of the product is at least twice that of the absorbing agent within the same volume unit of the interior region, wherein the thickness of the migration zone is from about 1 to about 100 microns and wherein the absorbing agent is concentrated within the migration zone in a gradient that increases from the interior region to the surface of the product.

12. The product according to claim 11 wherein the thermoplastic material is selected from the group consisting of a polymer of a single monomer, a copolymer of two or more monomers, a mixture of two or more polymers from single monomers, a mixture of two or more copolymers and a mixture of at least one polymer from a single monomer and at least one copolymer.

13. The product of claim 11 wherein the thermoplastic material is a mixture of at least one polymer of a single monomer and at least one copolymer.

14. The product of claim 13 wherein at least one copolymer contains a common monomeric unit with the polymer.

15. The product of claim 11 wherein the thermoplastic material is a mixture of two copolymers containing a common monomeric unit.

16. The product of claim 11 wherein the thickness of the migration zone is from about 10 to about 80 microns.

17. The product of claim 11 wherein the concentration of the absorbing agent within the migration zone is from about 2 to about 6 times that of the absorbing agent within the interior region of the product.

18. The product of claim 11 wherein the thermoplastic material is selected from the group consisting of polystyrenes, polyolefins, polyacrylates, polymethacrylates, polyimides, polycarbonates, polyethersulfones, polyamides, polyesters, polyvinyl chloride, styrene-butadiene rubbers, styrene-ethylene-butadiene-styrene copolymers, butyl rubbers, ethylene-propylene rubbers, ethylene-propylene-diene rubbers, ethylene vinyl acetate copolymers, ethylene-acrylates, butadiene-acrylonitrile, maleic anhydride modified polymers and copolymers, and grafted copolymers.

19. The product of claim 11 wherein the absorbing agent is selected from the group consisting of silica gel, zeolites, desiccant clay, molecular sieves activated carbon, earth alkali oxides and mixtures thereof.

20. A method for producing a moisture absorbent polymeric product comprising producing a thermoplastic material, combining the thermoplastic material in a molten state with an adsorbing agent, and subsequently forming the thermoplastic and adsorbing agent combination into the moisture absorbing polymeric product by using an extrusion method of manufacture, wherein the moisture absorbing polymeric product comprises a migration zone and an interior region, wherein the migration zone is defined as the portion of the product from its surface to where the accumulation of the absorbing agent levels off, wherein the absorbing agent is concentrated within the migration zone in a gradient that increases from the interior region to the surface of the product, and wherein the maximum concentration of the absorbing agent within a given volume unit of the migration zone at the surface of the product is at least about twice that of the absorbing agent within the same volume unit of the interior region.

21. A method for producing a moisture absorbent polymeric product comprising producing a thermoplastic material, combining the thermoplastic material in a molten state with an adsorbing agent, and subsequently forming the thermoplastic and adsorbing agent combination into the moisture absorbing polymeric product by using an injection molding method of manufacture, wherein the moisture absorbing polymeric product comprises a migration zone and in an interior region, wherein the migration zone is defined as the portion of the product from its surface to where the accumulation of the absorbing agent levels off, wherein the absorbing agent is concentrated within the migration zone in a gradient that increases from the interior region to the surface of the product, and wherein the maximum concentration of the absorbing agent within a given volume unit of the migration zone at the surface of the product is at least about twice that of the absorbing agent within the same volume unit of the interior region.

* * * * *